(12) United States Patent
Wolf et al.

(10) Patent No.: US 10,636,411 B1
(45) Date of Patent: Apr. 28, 2020

(54) ELECTRIFIED VEHICLE POWERTRAIN SOUND CONTROL METHOD AND ASSEMBLY

(71) Applicant: Ford Global Technologies, LLC, Dearborn, MI (US)

(72) Inventors: Christopher Wolf, Ann Arbor, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/157,211

(22) Filed: Oct. 11, 2018

(51) Int. Cl.
| | |
|---|---|
| *H04B 1/00* | (2006.01) |
| *G10K 15/02* | (2006.01) |
| *B60L 15/08* | (2006.01) |
| *H02P 31/00* | (2006.01) |
| *H03G 5/00* | (2006.01) |

(52) U.S. Cl.
CPC .............. *G10K 15/02* (2013.01); *B60L 15/08* (2013.01); *H02P 31/00* (2013.01); *B60L 2270/142* (2013.01); *B60Y 2306/09* (2013.01)

(58) Field of Classification Search
CPC ... G10K 15/02; B60L 15/08; B60L 2270/142; H02P 31/00; B60Y 2306/09
USPC .......................................... 381/86, 98; 18/65.1
See application file for complete search history.

(56) References Cited

U.S. PATENT DOCUMENTS

| | | | |
|---|---|---|---|
| 5,164,840 A | * | 11/1992 | Kawamura ...... G11B 20/00992 |
| | | | 381/1 |
| 8,174,376 B2 | | 5/2012 | Kirmse et al. |
| 9,478,214 B2 | | 10/2016 | Orth |
| 2004/0186708 A1 | | 9/2004 | Stewart |
| 2017/0217331 A1 | * | 8/2017 | Valeri .................... B60Q 5/008 |

FOREIGN PATENT DOCUMENTS

JP          5843687          1/2016

* cited by examiner

*Primary Examiner* — Ammar T Hamid
(74) *Attorney, Agent, or Firm* — David Kelley; Carlson, Gaskey & Olds, P.C.

(57) ABSTRACT

A sound control method includes altering at least one characteristic of power delivered within an electrified vehicle powertrain to cause at least one component of the electrified vehicle powertrain to emit different acoustic tones that follow a predetermined sequence. A sound control assembly includes a power characteristic control system that alters at least one characteristic of power delivered within an electrified vehicle powertrain to cause at least one component of the electrified vehicle powertrain to emit different acoustic tones that follow a predetermined sequence.

18 Claims, 4 Drawing Sheets

ELECTRIFIED VEHICLE POWERTRAIN SOUND CONTROL METHOD AND ASSEMBLY

TECHNICAL FIELD

This disclosure relates generally to intentionally adjusting sound emitted from an electrified vehicle powertrain.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Electrified vehicles can include an electric drivetrain that includes, among other things, the one or more electric machines and power converters. The electric drivetrain can emit sounds when operating. The sounds can be audible such that an individual can hear the sounds. The individual could instead, or additionally, perceive the sounds as vibrations transmitted through structures of the electrified vehicle.

SUMMARY

A sound control method according to an exemplary aspect of the present disclosure includes, among other things, altering at least one characteristic of power delivered within an electrified vehicle powertrain to cause at least one component of the electrified vehicle powertrain to emit sounds as a plurality of different acoustic tones that follow a predetermined sequence.

In another example of the foregoing method, the altering comprises changing a switching pattern of the power when pulse width modulating the power.

Another example of any of the foregoing methods, includes, prior to the altering, associating a switching frequency with each of the different acoustic tones in the predetermined sequence, and then altering the at least one characteristic of the power by changing the switching frequency to follow the predetermined sequence.

In another example of any of the foregoing methods, each of the plurality of different acoustic tones is the predetermined sequence is associated with a switching frequency that varies as a function of a speed and a torque of the electric machine.

In another example of any of the foregoing methods, the predetermined sequence includes at least two different acoustic tones.

In another example of any of the foregoing methods, the predetermined sequence includes at least one first acoustic tone emitted for a first duration, and at least one different, second acoustic tone emitted for a different, second duration.

In another example of any of the foregoing methods, the altering of the at least one characteristic comprises delivering the power with a first switching frequency to produce a specified acoustic tone from the electrified vehicle powertrain when the electric machine is operating at a first speed, and delivering the power with a second switching frequency to produce nominally the same specified acoustic tone from the electrified vehicle powertrain when the electric machine is operating at a different, second speed.

In another example of any of the foregoing methods, the specified tone is emitted from the electric machine.

In another example of any of the foregoing methods, the different acoustic tones comprise different inaudible sounds.

In another example of any of the foregoing methods, emitting the plurality of different acoustic tones following the predetermined sequence provides a melody.

In another example of any of the foregoing methods, the different acoustic tones each correspond to a different pitch of a note.

A sound control assembly according to another exemplary non-limiting aspect of the present disclosure includes, among other things, a power characteristic control system that alters at least one characteristic of power delivered within an electrified vehicle powertrain to cause at least one component of the electrified vehicle powertrain to emit sounds as plurality of different acoustic tones that follow a predetermined sequence.

Another example of the foregoing assembly includes an electric machine as the at least one component. The power characteristic control system alters at least one characteristic power delivered to the electric machine.

Another example of the foregoing assembly includes a traction battery powering the electric machine.

In another example of the foregoing assembly, the different acoustic tones comprise audible sounds and inaudible sounds.

In another example of the foregoing assembly, the power characteristic control system alters the at least one characteristic of the power by changing a switching frequency of the power when pulse width modulating the power.

In another example of the foregoing assembly, the predetermined sequence includes at least two different acoustic tones.

In another example of the foregoing assembly, the predetermined sequence includes at least one first acoustic tone emitted for a first time period, and at least one different, second tone acoustic emitted for a different, second time period.

In another example of the foregoing assembly, emitting the plurality of different acoustic tones following the predetermined sequence provides a melody.

In another example of the foregoing assembly, the different acoustic tones each correspond to a different pitch of a note.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to intentionally changing sounds emitted from powertrain components of an electrified vehicle. The sounds can include audible sounds that a user can hear. The emitted sounds can instead, or additionally, include inaudible sounds that are perceived by the user as vibrations transmitted through physical structures of the electrified vehicle.

The sounds can be varied such that the sounds are emitted as acoustic tones following a predetermined sequence. The user may then perceive the acoustic tones as a melody or song.

Characteristics of power delivered to the powertrain components can be altered by varying characteristics of the power to change sounds emitted from the powertrain components. The altering of the characteristics of the power can include adjusting a switching pattern of the power when pulse width modulating the power. Altering the switching pattern can include altering the switching frequency. Net power delivered to the powertrain components can remain the same before adjusting the switching pattern and after adjusting the switching pattern. Other alterable characteristics of power can include current, voltage, etc.

Figure 1:
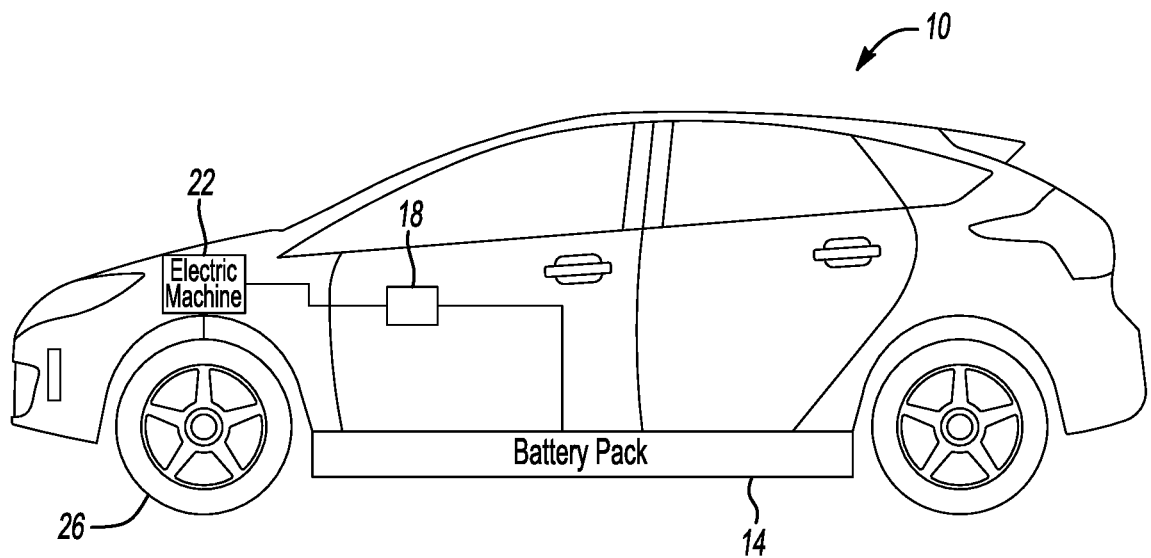
FIG. 1 illustrates a partially schematic side view of an electrified vehicle incorporating an electrified vehicle powertrain according to an exemplary aspect of the present disclosure.

With reference to FIG. 1, an example electrified vehicle 10 includes a traction battery 14, a power characteristic control system 18, an electric machine 22, and vehicle drive wheels 26. The electrified vehicle 10 is a battery electric vehicle (BEV) in this example.

The traction battery 14 powers the electric machine 22. When powered, the electric machine 22 generates torque to drive the wheels 26 that propel the electrified vehicle 10. The power characteristic control system 18 can adjust power provided to the electric machine 22.

The electric machine 22 is a permanent magnet (PM) synchronous motor in this example. In general, the electric machine 22 operates in response to commands from the power characteristic control system 18. The commands can include a voltage command, torque command, speed command, etc.

Although the electrified vehicle 10 is depicted as a BEV, it should be understood that the concepts described herein are not limited to BEVs and could extend to other types of electrified vehicles, including, but not limited to, plug-in hybrid electric vehicles (PHEVs), hybrid electrified vehicles (HEVs), etc. The scope of this disclosure can include any vehicle having an electric machine. That is, the electric machine 22 can be utilized in connection with the electrified vehicle 10, or within the powertrain of another type of electrified vehicle that uses a PM synchronous motor. In another type of electrified vehicle, the electric machine 22 could be utilized as the generator, or as a combined motor-generator.

Figure 2:
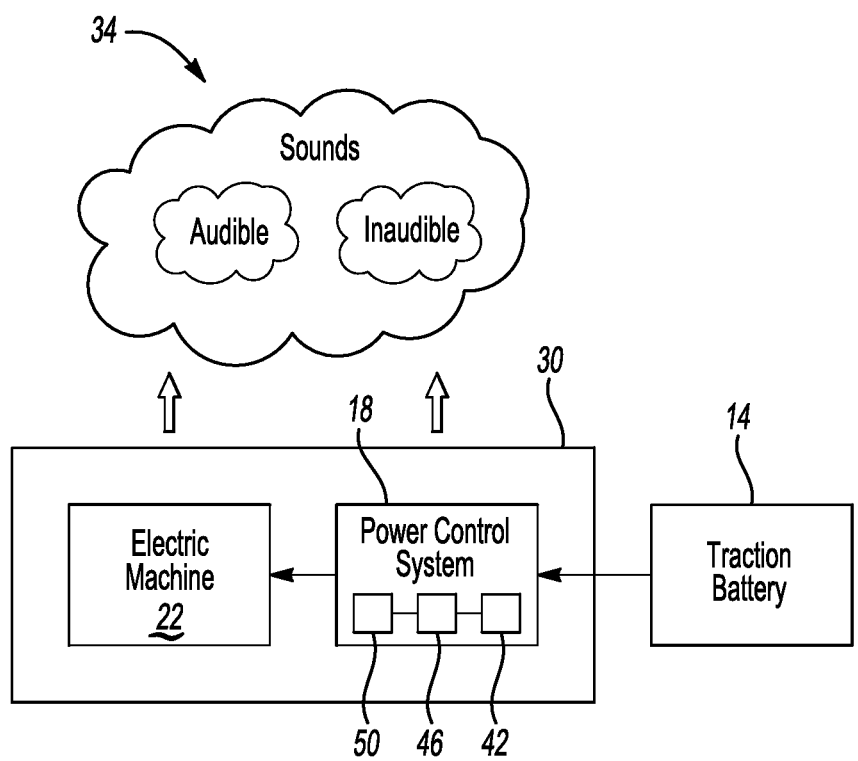
FIG. 2 illustrates a schematic view of selected portions of the vehicle of FIG. 1.

With reference now to FIG. 2, the electric machine 22 and the power characteristic control system 18 provide an electrified vehicle powertrain 30. When the electrified vehicle powertrain 30 is operating, the electrified vehicle powertrain 30 can emit sounds 34. The sounds can include audible sounds, inaudible sounds, or both. A user in a passenger compartment of the electrified vehicle 10, or proximate the electrified vehicle 10 outside the passenger compartment, can perceive the sounds. The user can hear the audible sounds, and perceive the inaudible sounds as vibrations.

The electric machine 22 can generate the sounds 34 during operation. The power characteristic control system 18 can instead, or additionally, generate the sounds 34 during operation.

Altering characteristics of power delivered within the electrified vehicle powertrain 30 can change the sounds 34. To alter characteristics of the power, the power characteristic control system 18 can pulse width modulate power sent to the traction battery 14 from the electric machine 22. Pulse width modulation can control and shape the flow of electrical power to and from various components of the electrified vehicle powertrain 30. Pulse width modulation can change the sounds 34 without having a significant negative impact on the controllability, efficiency, and torque production accuracy of the electrified vehicle powertrain 30.

The pulse width modulation can vary switching frequencies to adjust the power. Typically, in the prior art, switching frequencies are selected to reduce emissions of sound. This disclosure, in contrast to the prior art, describes an exemplary embodiment that varies characteristics of the power delivered within the electrified vehicle powertrain 30 to change the sounds 34 such that the sounds follow a predetermined sequence. The predetermined sequence can correspond to a melody or song, for example.

The power characteristic control system 18 includes a memory portion 42, a processor portion 46, and a switching portion 50. The power characteristic control system 18 can be a standalone controller, or incorporated into a controller system of the electrified vehicle 10, such as an engine control unit (ECU) or motor generator control unit.

To adjust the switching frequencies, the power characteristic control system 18 can include multiple separate controller systems in the form of multiple hardware devices, or multiple software controllers within one or more hardware devices. At least some portions of the power characteristic control system 18 could, in some examples, be located remotely from the electrified vehicle 10, such as when portions of the memory portion 42 are cloud-based.

The memory portion 42, as explained, can be partially cloud-based, or fully cloud-based. In other examples, the memory portion 42 resides entirely within the power characteristic control system 18. The memory portion 42 can include any one or combination of volatile memory elements.

The processor portion 46 of the power characteristic control system 18 can be programmed to execute a program stored in the memory portion 42. The processor can be custom made or commercially available processor, a central processing unit (CPU), an auxiliary processor among several processors associated with the controller system, a semiconductor-based microprocessor (in the form of a microchip or chipset) or generally any device for executing software-based instructions.

The switching portion 50 can include one or more switches that are opened and closed to control a switching frequency. The switches could be semiconductor switches, such as insulated-gate bipolar transistors (IGBTs), which are often used for pulse width modulation.

The program executed by the processor portion 46 could, for example, be stored in the memory portion 42 as software code. The program could include one or more additional or separate programs each of which includes an ordered list of executable instructions for implementing logical functions associated with the power characteristic control system 18.

The logical functions can include controlling the switching portion 50 according to a table stored within the memory portion 42. To adjust switching frequencies of the power during pulse width modulation, the processor portion 46 can command the switching portion 50 to open and close as desired.

Figure 3:
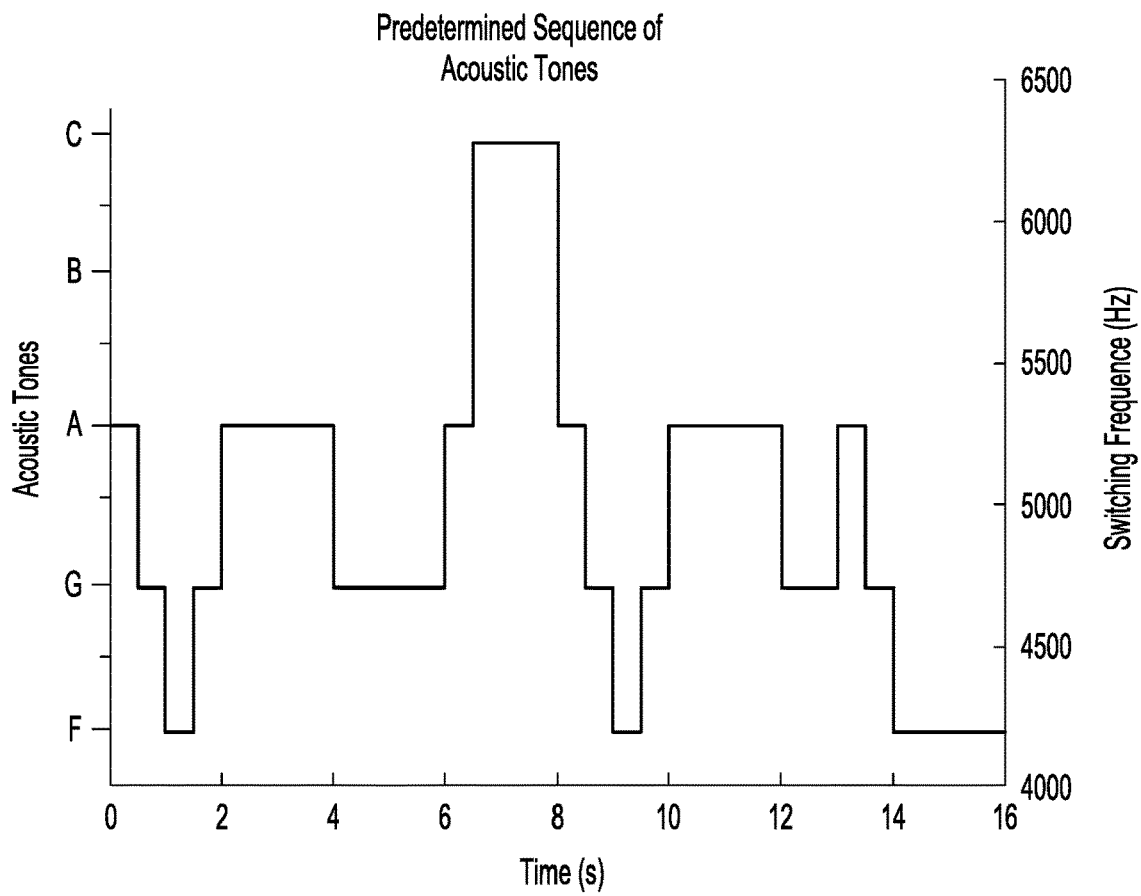
FIG. 3 illustrates a predetermined sequence of acoustic tones.

With reference to FIG. 3, and continued reference to FIGS. 1 and 2, the switching frequencies can be controlled through the power characteristic control system 18 so that the sound from the electrified vehicle powertrain 30 follows a predetermined sequence of acoustic tones. As shown, the predetermined sequence includes a specified acoustic tone and a specified duration for emitting the specified acoustic tone. Through pulse width modulation, both the switching frequency and the duration are adjusted by the power characteristic control system 18. The predetermined sequence of acoustic tones can be stored within the memory portion 42 and accessed as required.

In this exemplary non-limiting embodiment, the acoustic tones of the predetermined sequence correspond to musical notes. In particular, when the switching frequency is 5,250 Hz, the user perceives the sounds as an A note. When the switching frequency is 4,750 Hz, the user perceives the sounds as a G note. When the switching frequency is 4,250 Hz, the user perceives the sounds as an F note. When the switching frequency is 6,250 Hz, the user perceives the sounds as an A note.

When the switching frequencies are adjusted according to the exemplary predetermined sequence of acoustic tones in FIG. 3, the user perceives the sounds emitted from the electrified vehicle powertrain 30 as the melody "Mary Had a Little Lamb."

The range of switching frequencies is from 4000 Hz to 6500 Hz in FIG. 3. In other examples, the range could be from 1 kHz to 10 kHz.

The exemplary predetermined sequence of acoustic tones and associated switching frequencies in FIG. 3 are representative of an operating condition for the electric machine 22 where the electric machine is operating at a relatively constant speed and providing a relatively constant torque.

The switching frequencies resulting in a particular tone from the electrified vehicle powertrain 30 can vary in response to a rotational speed of the electric machine 22, a torque generated by the electric machine 22, or both. Accordingly, to hold a particular acoustic tone, the switching frequency may need to vary as the speed of the electric machine 22 changes, torque applied by the electric machine changes, or both. The switching frequency may need to increase, for example, to continue to hold an A note as the rotational speed of the electric machine 22 increases.

Figure 4:
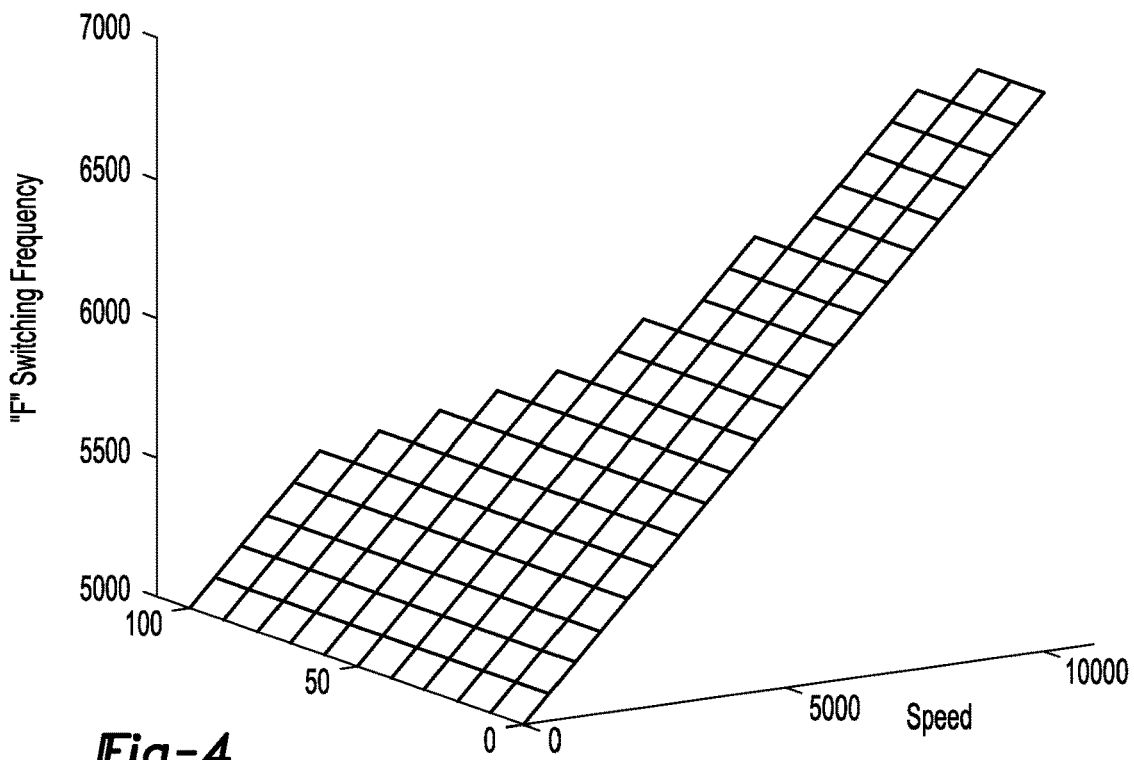
FIGS. 4-6 illustrate plots of switching frequencies for different acoustic tones at various combinations of torque and speed for an electric machine.
Figure 5:
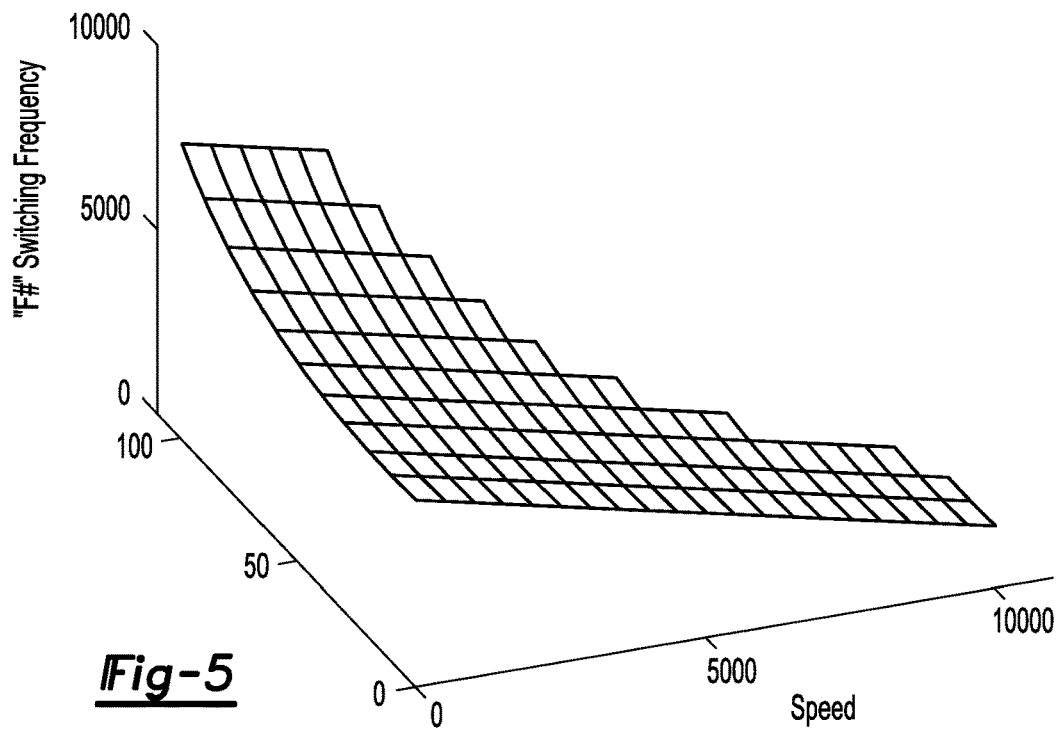
Figure 6:
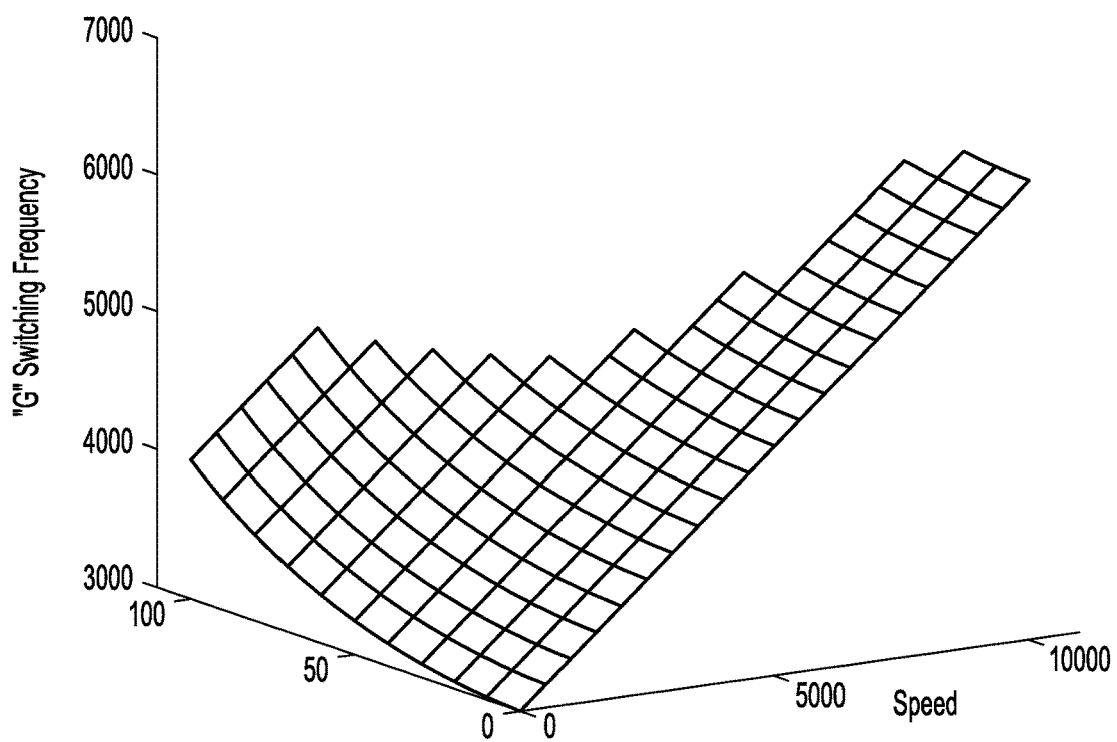

Accordingly, with reference to FIGS. 4-6 and continued reference to FIGS. 2 and 3, the switching frequencies necessary to emit specific tones for various combinations of torque and speed of the electric machine 22 can be stored in a look-up table within the memory portion 42 of the power characteristic control system 18. By referencing the look-up table, the processor portion 46 can command the switching portion 50 to provide a switching frequency corresponding to a specified tone within the predetermined sequence. The commanded switching frequency to produce the specified tone can change depending on the speed and torque of the electric machine 22. For example, the switching frequency can be adjusted as the speed of the electric machine 22 increases to ensure that the specified tone continues to be emitted.

The switching frequencies necessary to emit specific tones for various combinations of torque and speed of the electric machine 22 can be gathered through a calibration process. FIGS. 4-6 show exemplary maps of three specific tones. The calibration process to generate the maps that populate the look-up table could include operating the electrified vehicle powertrain 30 throughout various combinations of electric machine speeds, electric machine torques, and switching frequencies. The sounds emitted through calibration process are measured, associated with a particular acoustic tone, and mapped.

Figure 7:
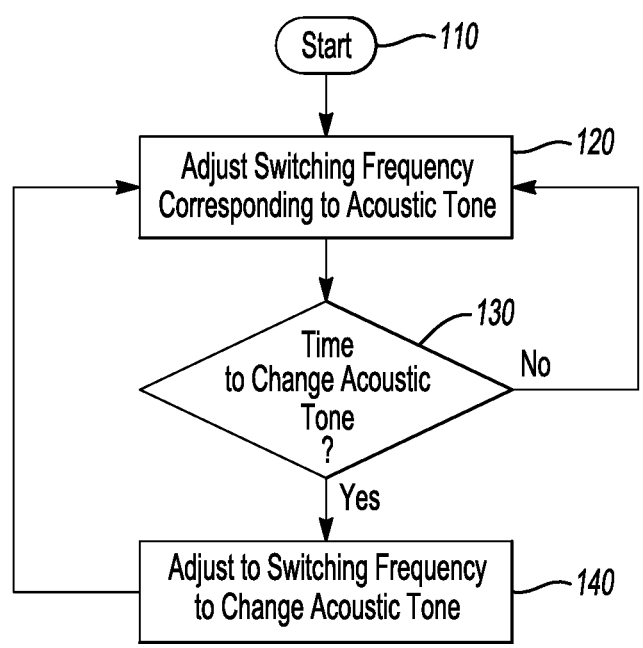
FIG. 7 illustrates the flow of an exemplary sound control method.

With reference now to FIG. 7 and continued reference to FIG. 2, an exemplary sound control method executed by the power characteristic control system 18 can start at a step 110. The method next adjusts a switching frequency at a step 120 so that the sound emitted from the electrified vehicle powertrain 30 corresponds to a specific acoustic tone. The adjustments may include changing the switching frequency so that the specific acoustic tone continues to be emitted as a speed or torque of the electric machine 22 changes.

Next, at a step 130, the method assesses whether changing the specific acoustic tone is required. This method may reference a predetermined sequence stored in the memory portion 42 when making this assessment. The predetermined sequence indicates which acoustic tone should be emitted and how long that acoustic tone should be emitted.

If the time to change the acoustic tone has not expired, the method moves back to the step 120. If the time to change the acoustic tone has expired, the method moves to the step 140, which adjust the switching frequency to change the specified acoustic tone to a different specified acoustic tone. The method then returns to the step 120.

Features of the disclosed examples include making adjustments to at least one characteristic of power delivered to electrified vehicle components in order to adjust sounds emitted from the electrified vehicle powertrain.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A sound control method, comprising:
   altering at least one characteristic of power delivered within an electrified vehicle powertrain to cause at least one component of the electrified vehicle powertrain to emit a plurality of different acoustic tones that follow a predetermined sequence, wherein emitting the plurality of different acoustic tones following the predetermined sequence provides a melody.

2. The acoustic control method of claim 1, wherein the altering comprises changing a switching pattern of the power when pulse width modulating the power.

3. The sound control method of claim 1, further comprising, prior to the altering, associating a switching frequency with each of the different acoustic tones in the predetermined sequence, and then altering the at least one characteristic of the power by changing the switching frequency to follow the predetermined sequence.

4. The sound control method of claim 3, wherein each of the plurality of different acoustic tones is the predetermined sequence is associated with a switching frequency that varies as a function of a speed and a torque of the electric machine.

5. The sound control method of claim 1, wherein the predetermined sequence includes at least two different acoustic tones.

6. The sound control method of claim 1, wherein the predetermined sequence includes at least one first acoustic tone emitted for a first duration, and at least one different, second acoustic tone emitted for a different, second duration.

7. A sound control method, comprising:

altering at least one characteristic of power delivered within an electrified vehicle powertrain to cause at least one component of the electrified vehicle powertrain to emit a plurality of different acoustic tones that follow a predetermined sequence, wherein the altering of at least one characteristic comprises delivering the power with a first switching frequency to produce a specified acoustic tone from the electrified vehicle powertrain when the electric machine is operating at a first speed, and delivering the power with a second switching frequency to produce nominally the same specified acoustic tone from the electrified vehicle powertrain when the electric machine is operating at a different, second speed.

8. The sound control method of claim 7, wherein the specified tone is emitted from the electric machine.

9. The sound control method of claim 1, wherein the different acoustic tones comprise different inaudible sounds.

10. The sound control method of claim 1, wherein the different acoustic tones each correspond to a different pitch of a note.

11. A sound control assembly, comprising:

a power characteristic control system that alters at least one characteristic of power delivered within an electrified vehicle powertrain to cause at least one component of the electrified vehicle powertrain to emit a plurality of different acoustic tones that follow a predetermined sequence, wherein emitting the plurality of different acoustic tones following the predetermined sequence provides a melody.

12. The sound control assembly of claim 11, further comprising an electric machine as the at least one component, the power characteristic control system altering the at least one characteristic of power delivered to the electric machine.

13. The sound control assembly of claim 11, further comprising a traction battery powering the electric machine.

14. The sound control assembly of claim 11, wherein the different acoustic tones comprise audible sounds and inaudible sounds.

15. The sound control assembly of claim 11, wherein the power characteristic control system alters the at least one characteristic of the power by changing a switching frequency of the power when pulse width modulating the power.

16. The sound control assembly of claim 11, wherein the predetermined sequence includes at least two different acoustic tones.

17. The sound control assembly of claim 11, wherein the predetermined sequence includes at least one first acoustic tone emitted for a first time period, and at least one different, second acoustic tone emitted for a different, second time period.

18. The sound control assembly of claim 11, wherein the different acoustic tones each correspond to a different pitch of a note.

* * * * *

UNITED STATES PATENT AND TRADEMARK OFFICE
CERTIFICATE OF CORRECTION

PATENT NO. : 10,636,411 B1  
APPLICATION NO. : 16/157211  
DATED : April 28, 2020  
INVENTOR(S) : Christopher Wolf and Michael W. Degner It is certified that error appears in the above-identified patent and that said Letters Patent is hereby corrected as shown below:

In the Claims

In Claim 2, Column 6, Line 51; replace "The acoustic control method of claim 1" with --The sound control method of claim 1--

In Claim 4, Column 6, Line 63; replace "the electric machine" with --an electric machine--

In Claim 7, Column 7, Line 14; replace "the electric machine" with --an electric machine--

In Claim 13, Column 8, Line 10; replace "claim 11" with --claim 12--

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*